(12) United States Patent
Cheng

(10) Patent No.: US 12,260,100 B2
(45) Date of Patent: Mar. 25, 2025

(54) DATA STORAGE DEVICE AND DATA PROCESSING METHOD FOR ARRANGING A WRITE ORDER OF WRITING DATA BASED ON A LOGICAL DATA ORDER OF READING THE DATA

(71) Applicant: Silicon Motion, Inc., Hsinchu County (TW)

(72) Inventor: Chi-Hung Cheng, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 18/226,246

(22) Filed: Jul. 25, 2023

(65) Prior Publication Data

US 2024/0361934 A1    Oct. 31, 2024

(30) Foreign Application Priority Data

Apr. 27, 2023   (TW) .................................. 112115775

(51) Int. Cl.
*G06F 3/06* (2006.01)

(52) U.S. Cl.
CPC ............ *G06F 3/064* (2013.01); *G06F 3/0626* (2013.01); *G06F 3/0658* (2013.01); *G06F 3/0688* (2013.01)

(58) Field of Classification Search
CPC ...... G06F 3/064; G06F 3/0626; G06F 3/0658; G06F 3/0688
See application file for complete search history.

(56) References Cited

U.S. PATENT DOCUMENTS

| 2020/0125294 A1* | 4/2020 | Parker ................. G06F 12/0871 |
| 2020/0249870 A1  | 8/2020 | Gola |
| 2021/0004323 A1  | 1/2021 | Kang |
| 2021/0064288 A1* | 3/2021 | Kanno .................. G06F 3/0604 |

FOREIGN PATENT DOCUMENTS

| CN | 111831584 A | 10/2020 |
| CN | 115469796 A | 12/2022 |
| TW | 201941202 A | 10/2019 |
| TW | 202249018 A | 12/2022 |

\* cited by examiner

*Primary Examiner* — Gurtej Bansal
(74) *Attorney, Agent, or Firm* — Winston Hsu

(57) ABSTRACT

A data storage device includes a memory device and a memory controller. In response to a write command received from a host device, the memory controller performs a write operation to write predetermined data into the memory device. In the write operation, the memory controller selects one from multiple superblocks as a first target superblock of the write operation and sequentially writes the portions of the predetermined data into the pages of the first target superblock in a cyclic manner among memory dies according to an order of plane indices. Each memory die includes at least a first plane and a second plane. In the write operation corresponding to the predetermined data, corresponding write operations performed on a first page on the first plane of all memory dies are earlier than corresponding write operations performed on a first page on the second plane of all memory dies.

18 Claims, 11 Drawing Sheets

FIG. 4

| Die[0] | | Die[1] | |
|---|---|---|---|
| Plane[0] | Plane[1] | Plane[0] | Plane[1] |
| 0 | 2 | 1 | 3 |
| 4 | 6 | 5 | 7 |
| 8 | 10 | 9 | 11 |

| CH[0] | | | | | | | | CH[1] | | | | | | | |
|---|---|---|---|---|---|---|---|---|---|---|---|---|---|---|---|
| CE[0] | | | | | | | | CE[1] | | | | | | | |
| Die[0] | | Die[1] | | Die[2] | | Die[3] | |
| Plane[0] | Plane[1] | Plane[0] | Plane[1] | Plane[0] | Plane[1] | Plane[0] | Plane[1] |
| 0 | 4 | 1 | 5 | 2 | 6 | 3 | 7 |
| 8 | 12 | 9 | 13 | 10 | 14 | 11 | 15 |
| 16 | 20 | 17 | 21 | 18 | 22 | 19 | 23 |

FIG. 5

| CH[0] | | | | | | | | CH[1] | | | | | | | |
|---|---|---|---|---|---|---|---|---|---|---|---|---|---|---|---|
| CE[0] | | | | | | | | CE[1] | | | | | | | |
| Die[0] | | Die[1] | | Die[2] | | Die[3] | | Die[0] | | Die[1] | | Die[2] | | Die[3] | |
| Plane[0] | Plane[1] | Plane[0] | Plane[1] | Plane[0] | Plane[1] | Plane[0] | Plane[1] | Plane[0] | Plane[1] | Plane[0] | Plane[1] | Plane[0] | Plane[1] | Plane[0] | Plane[1] |
| 0-0 Block[0] | 0-4 Block[1] | 0-1 Block[0] | 0-5 Block[1] | 0-2 Block[0] | 0-6 Block[1] | 0-3 Block[0] | 0-7 Block[1] | | | | | | | | |
| 1-0 Block[2] | 1-4 Block[3] | 1-1 Block[2] | 1-5 Block[3] | 1-2 Block[2] | 1-6 Block[3] | 1-3 Block[2] | 1-7 Block[3] | | | | | | | | |
| ... | ... | ... | ... | ... | ... | ... | ... | | | | | | | | |
| 49-0 Block[98] | 49-4 Block[99] | 49-1 Block[98] | 49-5 Block[99] | 49-2 Block[98] | 49-6 Block[99] | 49-3 Block[98] | 49-7 Block[99] | | | | | | | | |

| Die[0] | | Die[1] | |
|---|---|---|---|
| Plane[0] | Plane[1] | Plane[0] | Plane[1] |
| 0 | 1 | 2 | 3 |
| 4 | 5 | 6 | 7 |
| 8 | 9 | 10 | 11 |

| CH[0] | | | | | | | | CH[1] | | | | | | | |
|---|---|---|---|---|---|---|---|---|---|---|---|---|---|---|---|
| CE[0] | | | | | | | | CE[1] | | | | | | | |
| Die[0] | | Die[1] | | Die[2] | | Die[3] | | Die[0] | | Die[1] | | Die[2] | | Die[3] | |
| Plane[0] | Plane[1] | Plane[0] | Plane[1] | Plane[0] | Plane[1] | Plane[0] | Plane[1] | Plane[0] | Plane[1] | Plane[0] | Plane[1] | Plane[0] | Plane[1] | Plane[0] | Plane[1] |
| 0 | 1 | 2 | 3 | 4 | 5 | 6 | 7 | | | | | | | | |
| 8 | 9 | 10 | 11 | 12 | 13 | 14 | 15 | | | | | | | | |
| 16 | 17 | 18 | 19 | 20 | 21 | 22 | 23 | | | | | | | | |

FIG. 9

DATA STORAGE DEVICE AND DATA PROCESSING METHOD FOR ARRANGING A WRITE ORDER OF WRITING DATA BASED ON A LOGICAL DATA ORDER OF READING THE DATA

BACKGROUND OF THE INVENTION

1. Field of the Invention

The invention relates to a data processing method for a data storage device to effectively improving the efficiency of accessing the memory device.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, efficiency of the access operation in the data storage device has become an issue worthy of considering.

SUMMARY OF THE INVENTION

According to an embodiment of the invention, a data storage device comprises a memory device and a memory controller. The memory device comprises a plurality of memory dies. Each memory die comprises a plurality of planes, one of the planes of each memory die corresponds to one of a plurality of plane indices, and each plane comprises a plurality of memory blocks. Each memory block comprises a plurality of pages. The memory blocks form a plurality of superblocks. Each superblock comprises a predetermine number of the memory blocks and the predetermine number of the memory blocks are respectively in different planes of different memory dies. The memory controller is coupled to the memory device to access the memory device. In response to a write command received from a host device, the memory controller performs a write operation to write predetermined data into the memory device, and in the write operation, the memory controller selects one from the superblocks as a first target superblock of the write operation and sequentially writes a plurality of portions of the predetermined data into the pages of the first target superblock in a cyclic manner among the memory dies according to an order of the plane indices. Each memory die comprises at least a first plane and a second plane, in the write operation of the predetermined data, and corresponding write operations performed on a first page on the first plane of all memory dies of the first target superblock are earlier than corresponding write operations performed on a first page on the second plane of all memory dies of the first target superblock.

According to an embodiment of the invention, a data processing method, for a memory device comprising a plurality of memory dies, each memory die comprising a plurality of planes, one of the planes of each memory die corresponding to one of a plurality of plane indices, and each plane comprising a plurality of memory blocks, each memory block comprising a plurality of pages, the memory blocks forming a plurality of superblocks, each superblock comprising a predetermine number of the memory blocks and the predetermine number of the memory blocks respectively in different planes of different memory dies, comprises: performing a write operation in response to a write command received from a host device to write predetermined data into the memory device, wherein operation of performing the write operation comprises: selecting one from the superblocks as a first target superblock of the write operation; and sequentially writing a plurality of portions of the predetermined data into the pages of the first target superblock in a cyclic manner among the memory dies according to an order of plane indices. Each memory die comprises at least a first plane and a second plane, and operation of sequentially writing the plurality of portions of the predetermined data into the pages of the first target superblock in the cyclic manner among the memory dies according to the order of the plane indices comprises: sequentially performing a corresponding write operation on a first page on the first plane of all memory dies of the first target superblock; and sequentially performing a corresponding write operation on a first page on the second plane of all memory dies of the first target superblock. The corresponding write operations performed on the first pages on the first plane are earlier than the corresponding write operations performed on the first pages on the second plane.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 shows an exemplary write order of multiple pages of a superblock according to an embodiment of the invention.

FIG. 5 shows another exemplary write order of multiple pages of a superblock according to an embodiment of the invention.

FIG. 6 shows another exemplary write order across multiple superblocks according to an embodiment of the invention.

FIG. 8 shows an exemplary write order adopted in the prior art for the memory device having two memory dies and two planes.

FIG. 9 shows an exemplary write order adopted in the prior art for the memory device having four memory dies, dual-channel with two chip enable signals and two planes.

DETAILED DESCRIPTION

In the following, numerous specific details are described to provide a thorough understanding of embodiments of the invention. However, one of skilled in the art will understand how to implement the invention in the absence of one or more specific details, or relying on other elements, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
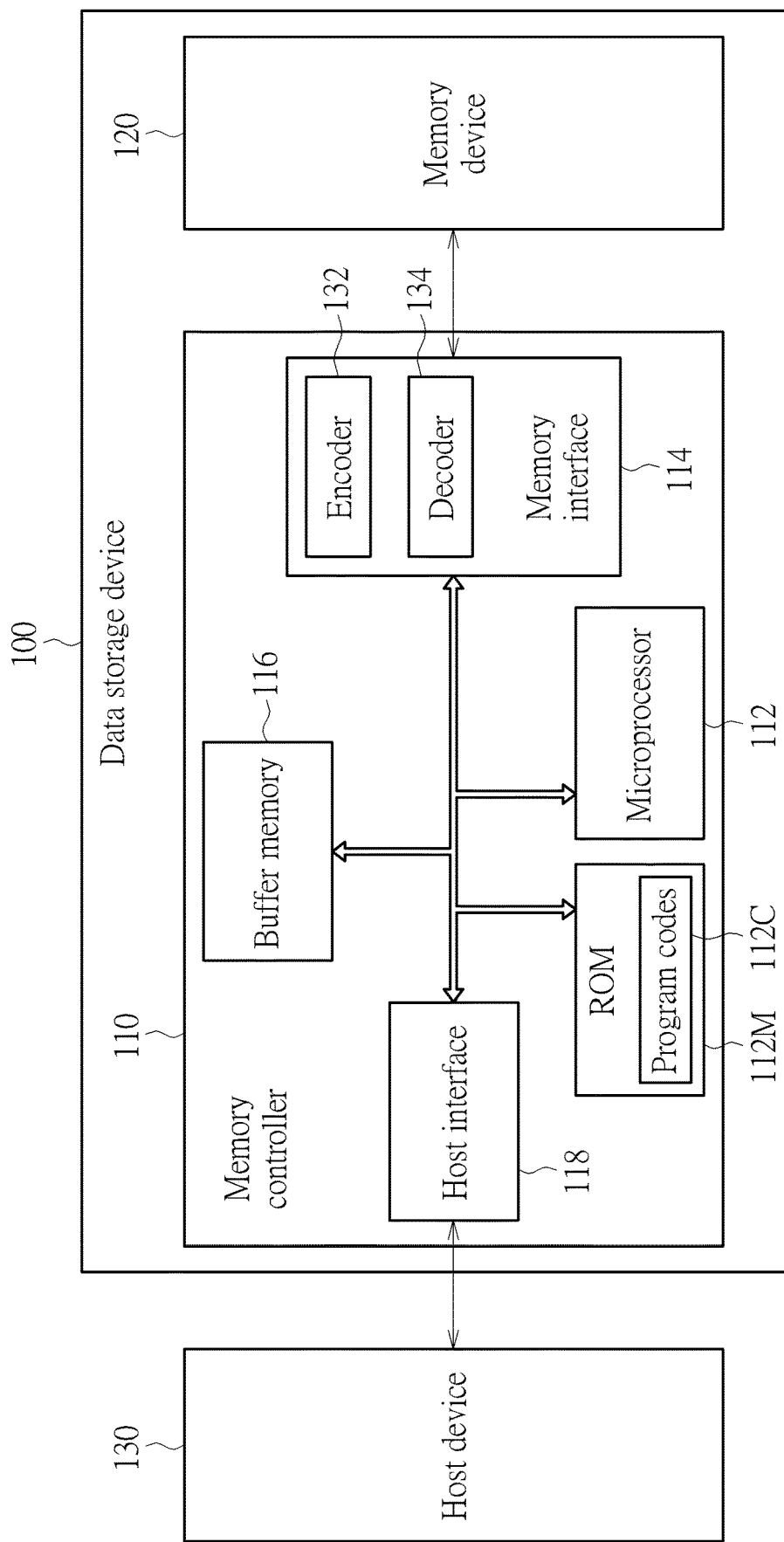
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more memory dies, or one or more memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), ... etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of memory dies or memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer ... etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be Single-Level Cell (SLC) memory blocks, Multiple-Level Cell (MLC) memory blocks, Triple-Level Cell (TLC) memory blocks, Quad-Level Cell (QLC) memory blocks, or other types of memory blocks with further more levels. Each memory cell (for example, the floating-gate transistor or other charge trap element) of the SLC memory block stores one bit of data, each memory cell of the MLC memory block stores two bits of data, each memory cell of the TLC memory block stores three bits of data and each memory cell of the QLC memory block stores four bits of data.

To improve the access efficiency, the memory chips (or called memory dies or Logical Unit Numbers (LUNs), which may have different names or may be presented in different forms, depending on the packaging method of the memory device) may share the data bus. That is, the memory chips of the memory device 120 may be coupled to the memory controller 110 through shared data bus. It is to be noted that configuring a plurality of memory chips and coupling the memory chips to the memory controller 110 through the shared data bus is not a limit of the invention. In an alternative embodiment of the invention, it may also be configuring a plurality of memory dies or LUNs in a memory device and coupling the memory dies or LUNs to the memory controller 110 through shared data bus. In the following paragraphs, the memory dies will be utilized as the exemplary memory elements to simplify the description. In addition, it is to be noted that each of the abovementioned chips, dies or LUNs sharing the data bus may respectively comprise one or more internal registers and may respectively maintain their own operating status.

In addition, to further improve the access efficiency, in some embodiments of the invention, the memory device 120 may have a multi-channel configuration, where each channel may correspond to one data bus. With multi-channel configuration, greater parallel processing benefits can be obtained when writing and reading data.

In the embodiments of the invention, regardless of whether the memory device 120 has a single-channel configuration or a multi-channel configuration, by properly arranging the write order of writing data into the memory device 120, the data written into a superblock (or, a read-write group) is specially arranged so that when the memory controller has to read the data in the future, the memory controller may directly read each portion of the data in a logical order (or called a logical data order), thereby solving the prior art problem of being necessary to temporarily buffer some portions of the data in the buffer memory 116 (or, in other data buffer of the memory controller 110) causing the portions of the data being unable to be immediately provided to the host device 130 right after they have been read from the memory device 120 due to the drawback that the memory controller cannot sequentially obtain each portion of the data in the logical order. Here, the logical order (or the logical data order) is an order of transferring data between the memory controller 110 and the host device 130. In this manner, the retention time that the data has to be buffered in the buffer memory 116 (or other data buffer) is greatly reduced and the data turnover rate of the buffer memory 116 (or other data buffer) is greatly improved.

According to an embodiment of the invention, the memory device 120 may comprise a plurality of memory dies and each memory die may comprise a plurality of planes. Each plane of each memory die may correspond to one of a plurality of plane indices (e.g., each plane of a memory die may be assigned a plane index), to differentiate between different planes. Therefore, one of the planes of each memory die corresponds to one of the plane indices. Each plane may comprise a plurality of memory blocks, and each memory block may comprise a plurality of pages. The memory blocks may form a plurality of superblocks, each superblock comprises a predetermine number of the memory blocks and the predetermine number of the memory blocks are respectively in different planes of different memory dies.

Figure 2:
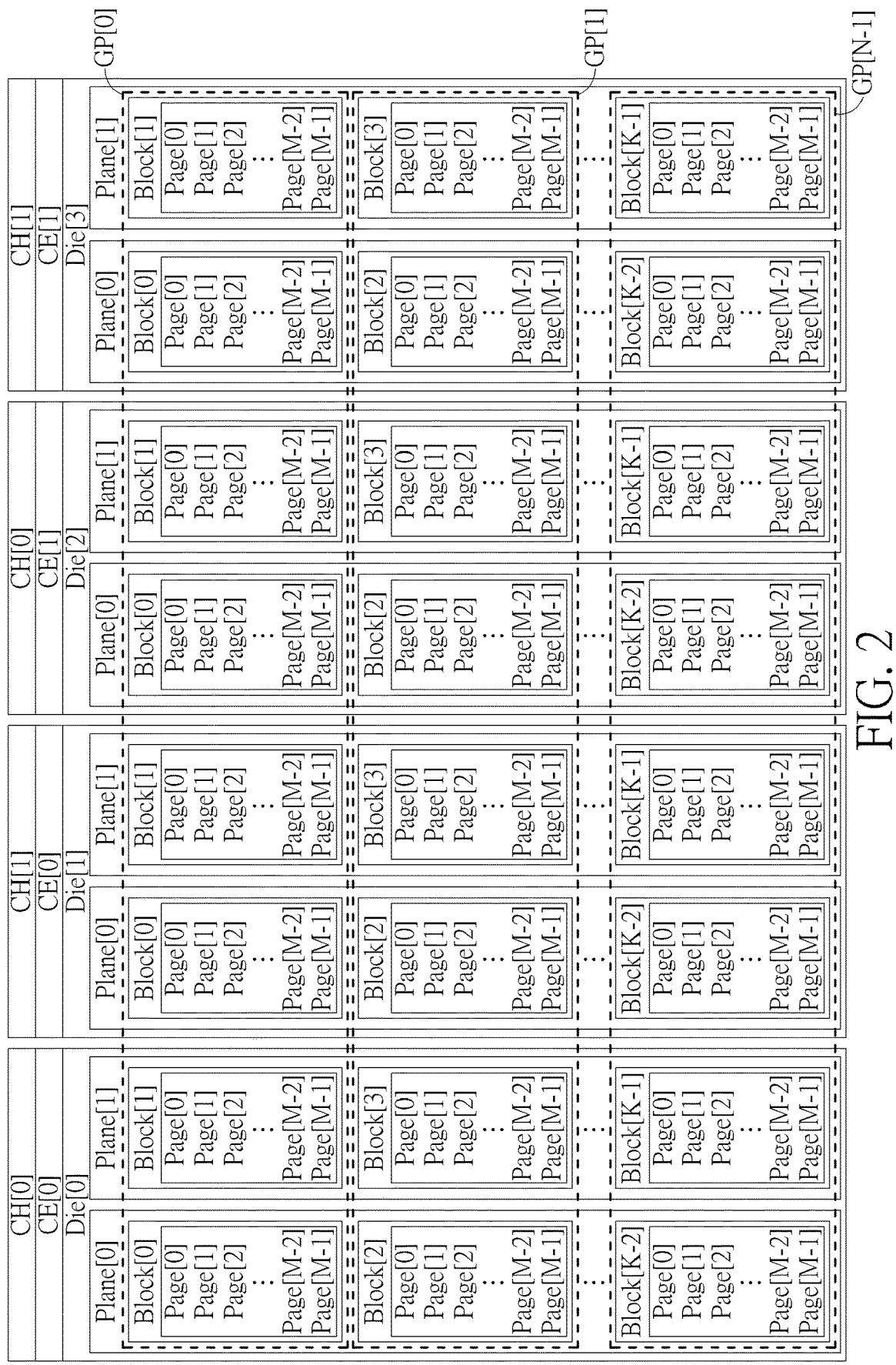
FIG. 2 shows an exemplary structure of a memory device according to an embodiment of the invention.

FIG. 2 shows an exemplary structure of a memory device according to an embodiment of the invention. In this embodiment, the memory device (e.g., the memory device 120) may comprise four memory dies, such as the memory dies Die[0], Die[1], Die[2] and Die[3] shown in FIG. 2, each memory die may correspond to one of a plurality of die indices (e.g., the numbers 0~3 in the square brackets), to differentiate between different memory dies.

In an embodiment of the invention, to gain the benefits of parallel processing, the memory device 120 may have a multi-channel configuration, for example, two channels CH[0] and CH[1] may be configured, wherein the memory dies Die[0] and Die[2] may be coupled to the channel CH[0] and the memory dies Die[1] and Die[3] may be coupled to the coupled to the channel CH[1]. In addition, since the memory dies Die[0] and Die[2] are both coupled to the channel CH[0], the memory dies Die[0] and Die[2] may be coupled to the memory controller (e.g., the memory controller 110) through the shared data bus. Similarly, the memory dies Die[1] and Die[3] may be coupled to the memory controller (e.g., the memory controller 110) through the shared data bus. The memory controller 110 may use different chip enable signals to enable corresponding memory dies. As an example, the memory controller 110 may enable the memory dies Die[0] and Die[1] by using the chip enable signal CE[0] and enable the memory dies Die[2] and Die[3] by using the chip enable signal CE[1].

In this embodiment, each memory die may comprise two planes, such as the planes Plane[0] and Plane[1] shown in FIG. 2, and the two planes of each memory die may be respectively assigned one of the two plane indices (e.g., the numbers 0~1 in the square brackets) to differentiate between different planes. Each memory die may also comprise a plurality of memory blocks, such as the memory blocks Block[0]~Block[K−1] shown in FIG. 2, where K is a positive integer. Each memory block may correspond to one of a plurality of block indices (e.g., the numbers 0~(K−1) in the square brackets) to differentiate between memory blocks. Each plane may comprise multiple memory blocks of the corresponding memory die. As an example, the plane Plane[0] (or called the first plane) may comprise memory blocks Block[0], Block[2], . . . . Block[K−2] and the plane Plane[1] (or called the second plane) may comprise memory blocks Block[1], Block[3], . . . . Block[K−1]. In addition, each memory block may comprise a plurality of pages, such as the pages Page[0], Page[1], Page[2], ..., Page[M-2] and Page[M-1], where M is a positive integer.

According to an embodiment of the invention, the memory blocks Block[0]~Block[K-1] may for a plurality of superblocks, such as the superblocks GP[0], GP[1], ..., GP[N-1] shown in FIG. 2, where N is a positive integer and the aforementioned superblock may also be regarded as a read-write group in the embodiments of the invention. Each superblock may comprise a predetermined number of memory blocks, and the predetermine number of the memory blocks may be respectively in different planes of different memory dies. For example, in the example shown in FIG. 2, the predetermined number is 8.

In the embodiments of the invention, by applying the proposed data processing method, the memory controller 110 may arrange the order of writing each portion of predetermined data into the memory device 120 for the data stored in a superblock (e.g., a read-write group) being specially arranged. In this manner, when the memory controller 110 has to read the predetermined data from the memory device 120 in the future, the memory controller 110 may directly read each portion of the predetermined based on a logical order, which is just an order required for transferring data between the memory controller 110 and the host device 130. In some embodiments, the order required for transferring data between the memory controller 110 and the host device 130. In some embodiments of the invention, the order required for transferring data between the memory controller 110 and the host device 130 is just the order of logical addresses utilized by the host device 130 to identify the data. As an example, assuming that a piece of data comprises four portions Data_P[0]~Data_P[3] which respectively correspond to the logical addresses LBA[0]~LBA[3], after the data has been written into the memory device 120 by applying the proposed data processing method, when the memory controller 110 has to read the data, the memory controller 110 may sequentially read the four portions Data_P[0]~Data_P[3] of the data from the memory device 120, and the memory controller 110 may directly provide each read portion to the host device 130 right after the read operation of the corresponding portion is completed without the need of waiting for completion of the read operation of other portion of the data (since the memory controller 110 is able to obtain the four portions Data_P[0]~Data_P[3] of the data in a correct order). In this manner, the retention time that the data has to be buffered in the buffer memory 116 (or other data buffer) is greatly reduced and the data turnover rate of the buffer memory 116 (or other data buffer) is greatly improved.

Figure 3:
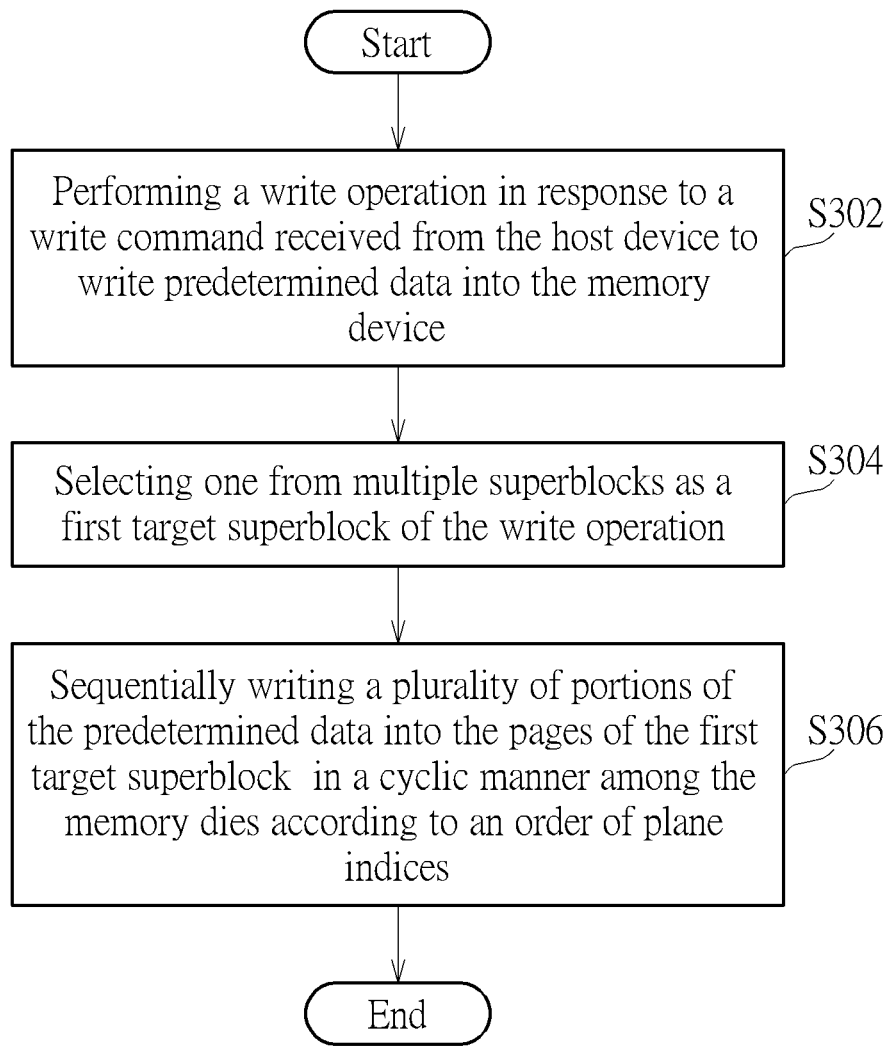
FIG. 3 is an exemplary flow chart of a data processing method according to an embodiment of the invention.

FIG. 3 is an exemplary flow chart of a data processing method according to an embodiment of the invention. The data processing method comprises the following steps performed by the memory controller 110:

Step S302: performing a write operation in response to a write command received from the host device 130 to write predetermined data into the memory device 120.

Step S304: selecting one from multiple superblocks as a first target superblock of the write operation.

Step S306: sequentially writing a plurality of portions of the predetermined data into the pages of the first target superblock (i.e., the pages belonging to the first target superblock) in a cyclic manner among the memory dies according to an order of plane indices. Note that steps S304 and S306 may also be regarded as parts of the operation comprised in step S302.

In some embodiments of the invention, the order of plane indices may be an order of ascending (or descending) values, but the invention is not limited thereto. In some other embodiments of the invention, the order of plane indices may also be an order in which the plane indices are arbitrarily arranged, and the spirit of operation in step S306 is to sequentially write the portions of the predetermined data into the pages of the first target superblock in a cyclic manner among the memory dies according to a predetermined order of the plane indices.

To be more specific, according to an embodiment of the invention, step S306 may further comprise the following detailed steps/operations performed by the memory controller 110:

Sequentially performing a corresponding write operation on a first page on the first plane of all memory dies of the first target superblock; and Sequentially performing a corresponding write operation on a first page on the second plane of all memory dies of the first target superblock.

For a corresponding write operation performed on one page, the memory controller 110 may write a portion, which has not been written into the memory device and has a size equal to the amount of data that can be stored in one page, of the predetermined data into the page. In the embodiments of the invention, the aforementioned one page may correspond to one physical page, but the invention is also not limited thereto. In alternative embodiments of the invention, the aforementioned one page may correspond to one physical address. As an example, one physical address may store 4 Kbytes (KB) of data, and the amount of data that can be stored in one physical page may be 16 KB.

According to an embodiment of the invention, the corresponding write operations performed on the first pages on the first plane are earlier than the corresponding write operations performed on the first pages on the second plane.

In addition, according to an embodiment of the invention, when the corresponding write operations performed on the first pages on the first plane of all memory dies of the first target superblock and the corresponding write operations performed on the first pages on the second plane of all memory dies of the first target superblock are completed, step S306 may further comprise the following detailed steps/operations performed by the memory controller 110:

Sequentially performing a corresponding write operation on a second page on the first plane of all memory dies of the first target superblock; and Sequentially performing a corresponding write operation on a second page on the second plane of all memory dies of the first target superblock.

According to an embodiment of the invention, the corresponding write operations performed on the second pages on the first plane are earlier than the corresponding write operations performed on the second pages on the second plane. That is, when the corresponding write operations on the second pages on the first plane of all memory dies of the first target superblock are completed, the memory controller 110 continues to perform the corresponding write operations on the second pages on the second plane of all memory dies of the first target superblock.

FIG. 4 shows an exemplary write order of multiple pages of a superblock according to an embodiment of the invention. In this embodiment, the exemplary write order of the pages for a memory device having two memory dies (such as the memory dies Die[0] and Die[1] shown in FIG. 4) and two planes (such as the planes Plane[0] and Plane[1] shown in FIG. 4) is illustrated.

In FIG. 4, one field written with a number marked by a underline, such as one of the numbers 0~11 shown in FIG.

4, represents one page, and one filed in the first row of such fields represents a first page of a predetermined memory block on the corresponding plane of the corresponding memory die, one filed in the second row of such fields represents a second page of the predetermined memory block on the corresponding plane of the corresponding memory die, and the rest may be deduced by analogy. In addition, in FIG. 4, the numbers marked by underlines illustrate the write order of the pages of the superblock when the superblock is selected as a target superblock of a write operation, where smaller number means earlier the page is written. For example, the field written with the number 0 marked by underline is the earliest written page, the field written with the number 1 marked by underline is the secondary written page, and so on.

Taking the write order shown in FIG. 4 as an example, in the write operation of the predetermined data, corresponding write operations performed on the pages of a target superblock comprise, in a chronological order, the corresponding write operation performed on the first page on the first plane (e.g., the plane Plane[0]) of the first memory die (e.g., the memory die Die[0]), the corresponding write operation performed on the first page on the first plane of the second memory die (e.g., the memory die Die[1]), the corresponding write operation performed on the first page on the second plane (e.g., the plane Plane[1]) of the first memory die, the corresponding write operation performed on the first page on the second plane of the second memory die, the corresponding write operation performed on a second page on the first plane of the first memory die, the corresponding write operation performed on a second page on the first plane of the second memory die, the corresponding write operation performed on a second page on the second plane of the first memory die, and the corresponding write operation performed on a second page on the second plane of the second memory die, and the rest may be deduced by analogy. Note that the ordinal numbers used here to describe the first page, the second page, etc. may correspond to the numbers assigned based on physical positions or physical addresses of the pages in a memory block. As an example, the first page may be the first (starting) page of the memory block, the second page may a next page following the first page, and so on.

In this embodiment, the first memory die (e.g., the memory die Die[0]) and the second memory die (e.g., the memory die Die[1]) may be coupled to same or different channels of the memory device 120, and the invention is not limited to any specific way of implementation.

FIG. 5 shows another exemplary write order of multiple pages of a superblock according to an embodiment of the invention. In this embodiment, the exemplary write order of the pages for a memory device having four memory dies (such as the memory dies Die[0], Die[1], Die[2] and Die[3] shown in FIG. 5), dual-channel (such as the channels CH[0] and CH[1] shown in FIG. 5) with two chip enable signals (such as the chip enable signals CE[0] and CE[1] shown in FIG. 5) and two planes (such as the planes Plane[0] and Plane[1] shown in FIG. 5) is illustrated.

Similarly, in FIG. 5, one field written with a number marked by a underline, such as one of the numbers 0~23 shown in FIG. 5, represents one page, and one filed in the first row of such fields represents a first page of a predetermined memory block on the corresponding plane of the corresponding memory die, one filed in the second row of such fields represents a second page of the predetermined memory block on the corresponding plane of the corresponding memory die, and the rest may be deduced by analogy. In addition, in FIG. 5, the numbers marked by underlines illustrate the write order of the pages of the superblock when the superblock is selected as a target superblock of a write operation, where smaller number means earlier the page is written. For example, the field written with the number 0 marked by underline is the earliest written page, the field written with the number 1 marked by underline is the secondary written page, and so on.

Taking the write order shown in FIG. 5 as an example, in the write operation of the predetermined data, corresponding write operations performed on the pages of a target superblock comprise, in a chronological order, the corresponding write operation performed on the first page on the first plane (e.g., the plane Plane[0]) of the first memory die (e.g., the memory die Die[0]), the corresponding write operation performed on the first page on the first plane of the second memory die (e.g., the memory die Die[1]), the corresponding write operation performed on the first page on the first plane of the third memory die (e.g., the memory die Die[2]), the corresponding write operation performed on the first page on the first plane of the fourth memory die (e.g., the memory die Die[3]), the corresponding write operation performed on the first page on the second plane (e.g., the plane Plane[1]) of the first memory die, the corresponding write operation performed on the first page on the second plane of the second memory die, the corresponding write operation performed on the first page on the second plane of the third memory die, the corresponding write operation performed on the first page on the second plane of the fourth memory die, the corresponding write operation performed on a second page on the first plane of the first memory die, the corresponding write operation performed on a second page on the first plane of the second memory die, the corresponding write operation performed on a second page on the first plane of the third memory die, the corresponding write operation performed on a second page on the first plane of the fourth memory die, the corresponding write operation performed on a second page on the second plane of the first memory die, the corresponding write operation performed on a second page on the second plane of the second memory die, the corresponding write operation performed on a second page on the second plane of the third memory die, and the corresponding write operation performed on a second page on the second plane of the fourth memory die. Note that the ordinal numbers used here to describe the first page, the second page, the third page and the fourth page, etc. may correspond to the numbers assigned based on physical positions or physical addresses of the pages in a memory block. As an example, the first page may be the first (starting) page of the memory block, the second page may a next page following the first page, the third page may a next page following the second page, and so on.

In this embodiment, the first memory die (e.g., the memory die Die[0]) and the third memory die (e.g., the memory die Die[2]) may be coupled to the first channel (e.g., the channel CH[0]) of the memory device 120, and the second memory die (e.g., the memory die Die[1]) and the fourth memory die (e.g., the memory die Die[3]) may be coupled to the second channel (e.g., the channel CH[1]) of the memory device 120.

According to an embodiment of the invention, when a size of an available space of the first target superblock selected in step S304 is smaller than or equal to a threshold, as an example, when all the memory blocks in the first target superblock are full (e.g., the available space is zero or nearly zero) or when the available space of the memory blocks in the first target superblock is less than 5% or 3% of the overall capacity of a superblock, the memory controller 110 may perform the following steps after step S306 is performed:

selecting another from the superblocks as a second target superblock of the write operation according to an order of the superblock indices; and sequentially writing remaining portions of the predetermined data that have not been written in the memory device into the pages of the second target superblock in the cyclic manner among the memory dies according to the order of plane indices, which is similar to the write operation performed on the first target superblock.

In the embodiments of the invention, the order of superblock indices may be an order of ascending (or descending) values, but the invention is not limited thereto.

FIG. 6 shows another exemplary write order across multiple superblocks (read-write groups) according to an embodiment of the invention. In this embodiment, the exemplary write order of the pages for a memory device having four memory dies, dual-channel with two chip enable signals and two planes is illustrated. Different from the exemplary write order shown in FIG. 5, in which the write order of multiple pages (e.g., the pages comprised in a corresponding memory block) is shown, in the exemplary write order shown in FIG. 6, the write order of multiple memory blocks is shown.

In FIG. 6, one field written with a symbol A-B marked by a underline represents one memory block, and one filed in the first row of such fields represents one memory block comprised in a first superblock (a first read-write group), one filed in the second row of such fields represents one memory block comprised in a second superblock (a second read-write group), and the rest may be deduced by analogy.

In addition, in the embodiment shown in FIG. 6, the memory blocks Block[0]~Block[99] having the same block index among the memory dies may belong to the same superblock (that is, the same read-write group), and each memory die comprises 100 memory blocks and two planes. Therefore, there are 50 superblocks shows in FIG. 6.

The symbol A-B marked by a underline in FIG. 6 is used to represent the write order of the superblocks (that is, the read-write groups) and the write order of the memory blocks in a superblock, where smaller number means earlier the superblock/memory block is written. For easy distinction, the alphabet A in the symbol A-B is named as the first digit, and the alphabet B in the symbol A-B is named as the second digit. As an example, for the first digit A, the field written with the number 0 marked by a underline is the first (earliest) written superblock (read-write group), the field written with the number 1 marked by a underline is the second written superblock (read-write group), and so on. For the second digit B, the field written with the number 0 marked by a underline is the first (earliest) written memory block in the corresponding superblock (read-write group), the field written with the number 1 marked by a underline is the second written memory block in the corresponding superblock (read-write group), and so on. Therefore, for the second digit B, the field written with the number 7 marked by a underline is the last written memory block in the corresponding superblock (read-write group).

Figure 7:
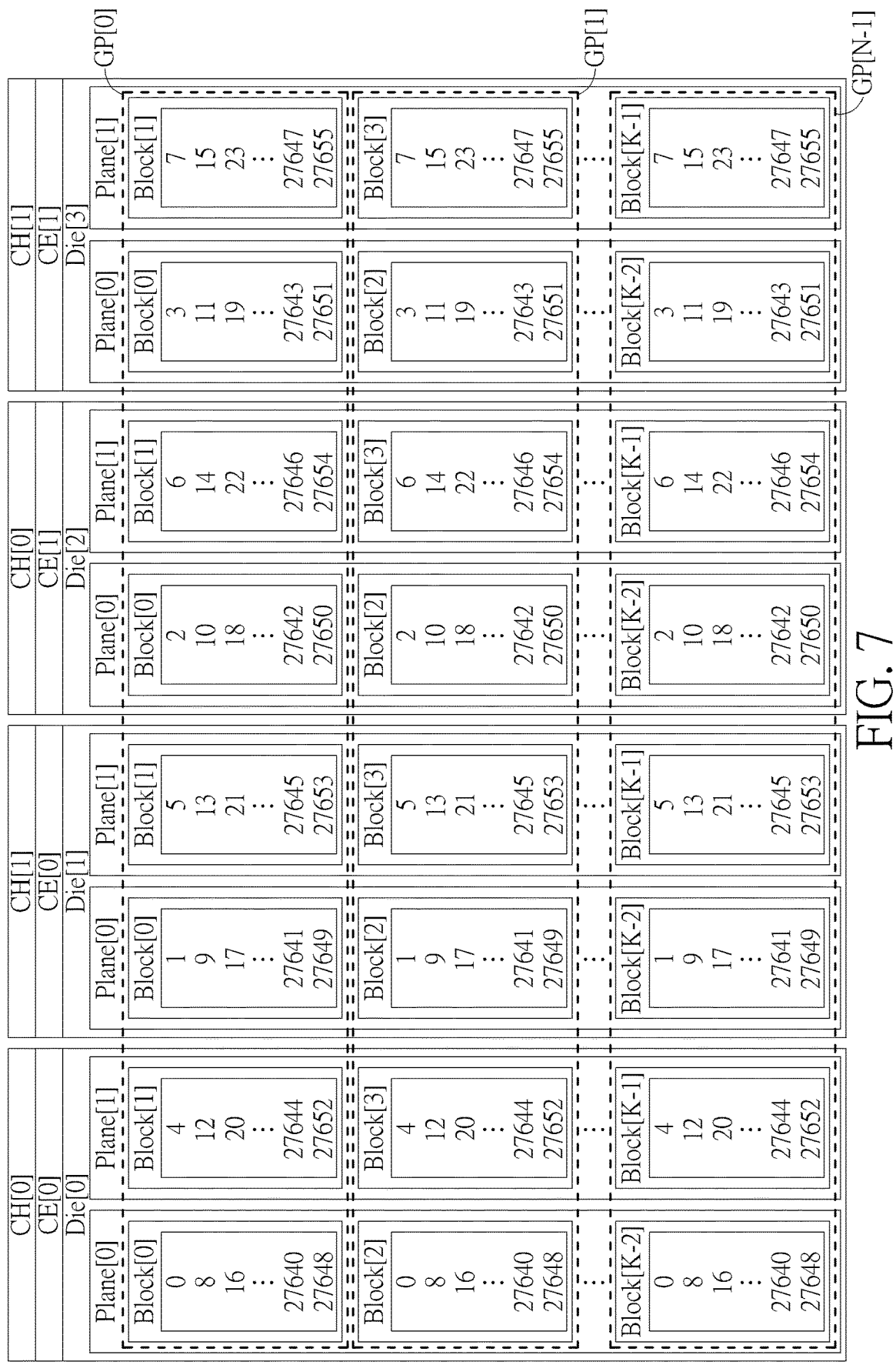
FIG. 7 shows another exemplary write order across multiple superblocks according to an embodiment of the invention.

FIG. 7 shows another exemplary write order across multiple superblocks (read-write groups) according to an embodiment of the invention. This embodiment shows the write order of each page corresponding to the structure shown in FIG. 2. In this embodiment, each memory block comprises 3457 pages. Therefore, the numbers 0~27655 drawn in FIG. 7 show the write order of the pages in each corresponding superblock. In addition, in this embodiment, the memory controller 110 sequentially performs the corresponding write operation on the superblocks GP[0], GP[1], . . . , GP[N−1] according to the order of ascending superblock index value. That is, the data is written into the superblock GP[0] first. When the size of available space of the superblock GP[0] is smaller than or equal to a threshold, the data is written into the superblock GP[1], and the rest may be deduced by analogy.

Those skilled in the art can deduce the write order of other memory device structures based on the illustration in FIG. 4~FIG. 7 and the related description of any variance are omitted here for brevity.

Assuming that the predetermined data comprises a plurality of portions, such as a plurality of portions correspond to a plurality of consecutive logical addresses as described above, and each portion is written into one page of the memory device in the corresponding write operation as described above, in the embodiments of the invention, two or more adjacent portions of the predetermined data (for example, two or more portions with consecutive logical addresses) are written into two different memory dies.

FIG. 8 shows an exemplary write order adopted in the prior art for the memory device having two memory dies and two planes, where the memory device structure described herein corresponds to the embodiment shown in FIG. 4. FIG. 9 shows an exemplary write order adopted in the prior art for the memory device having four memory dies, dual-channel with two chip enable signals and two planes, where the memory device structure described herein corresponds to the embodiment shown in FIG. 5. In the prior art, data is consecutively written to different planes of the same memory die. After all the planes of a memory die are written with data, the data will be then written into the next memory die. Therefore, in prior art, adjacent portions of the data will be written into the same memory die.

Different from the write order adopted in the prior art, in the embodiments of the invention, the data is written in the order of plane indices, so that adjacent portions of the data are written into different memory dies. In this manner, when reading the data, each portion of the data is read based on the required logical order. As an example, in response to a read command received from the host device 130 to read the predetermined data, the memory controller 110 reads the predetermined data from the memory device based on a logical order (or, the aforementioned logical data order), wherein the logical order of reading the predetermined data equals to the write order (or called physical data order) of writing the predetermined data into the memory device 120, and read data may be directly or immediately provided to the host device 130 without the need of being buffered in the buffer memory 116 to wait for completion of the read operation of other portion of the data. It is to be noted that, in the embodiment of the invention, the logical order (or called logical data order) is an order of transferring data between the memory controller 110 and the host device 130, while the physical data order is an order of transferring data between the memory controller 110 and the memory device 120.

Figure 10:
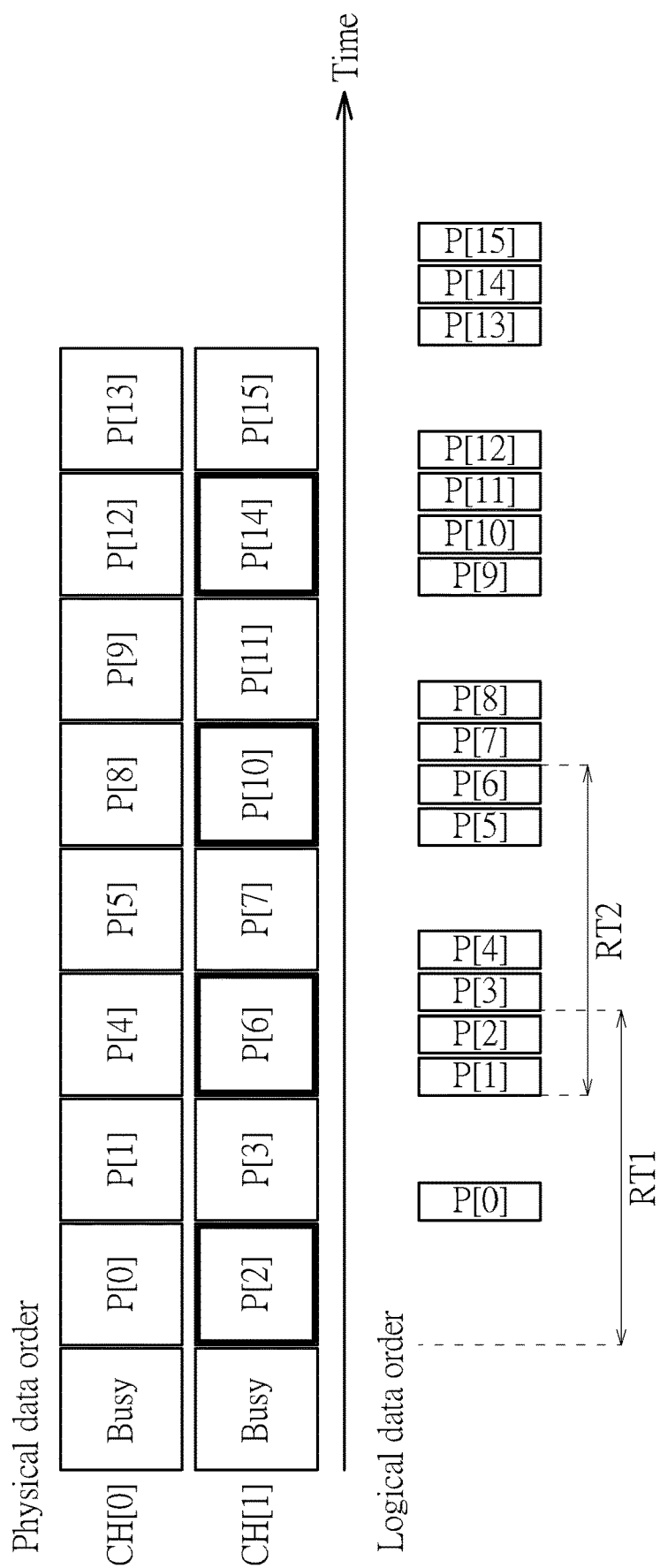
FIG. 10 shows a timing diagram of a read operation to illustrate the corresponding physical data order and logical data order of the read operation performed on the data that was written based on the write order adopted by the prior art.

FIG. 10 shows a timing diagram of a read operation to illustrate the corresponding physical data order and logical data order of the read operation performed on the data that was written based on the write order adopted by the prior art. In FIG. 10, the part above the time axis shows the timing of reading data from the memory device, where the symbols of the pages P[0]~P[15] are utilized therein to represent the read operations of the corresponding pages, and the part below the time axis shows the timing of providing the read data obtained by the memory controller 110 to the host device, where the symbols of the pages P[0]~P[15] are utilized therein to represent the output operations of the corresponding read pages.

In FIG. 10, the numbers in the square brackets correspond to the numbers marked by underlines in FIG. 9. With the reference to FIG. 9, those skilled in the art knows into which plane of which memory die each page in FIG. 10 was written, and the consecutive numbers 0~15 in this example are also utilized to represent the continuity of data (e.g., the continuity of the logical addresses of the data, which also shows the logical data order).

As shown in FIG. 10, it is assumed that the read operation of channel CH[0] is slightly earlier than the read operation of channel CH[1], the physical data order in the prior art is P[0], P[2], P[1], P[3], P[4], P[6], P[5], P[7], and so on (if the read operation of channel CH[0] and the read operation of channel CH[1] are finished at the same time, the physical data order in the prior art may be represented by (P[0] & P[2]), (P[1] &P[3]), and so on). As can be seen from FIG. 10, performance of the read operation of page P[2] is earlier than that of page[1], and performance of the read operation of page P[6] is earlier than that of page[5]. However, since it is necessary for the host device 130 to obtain the data in the logical data order P[0], P[1], P[2], P[3], P[4], P[5], P[6] and P[7], after obtaining the data of page P[2], the data of page P[2] has to be buffered in the buffer memory 116 and cannot be directly output and provided to the host device 130 until the memory controller 110 obtains the data of page[1] and provide it to the host device. Therefore, the retention time RT1 is generated. Similarly, output of the data of page P[6] also generates the retention time RT2. It can also be seen in FIG. 10 that after outputting the data of pages P[0], P[4], P[8], P[12], in order to make the order of transferring data to be the required (correct) logical data order, there will always be a period of waiting time (e.g., the retention time shown in FIG. 10) due to the inability to the output data continuously.

Figure 11:
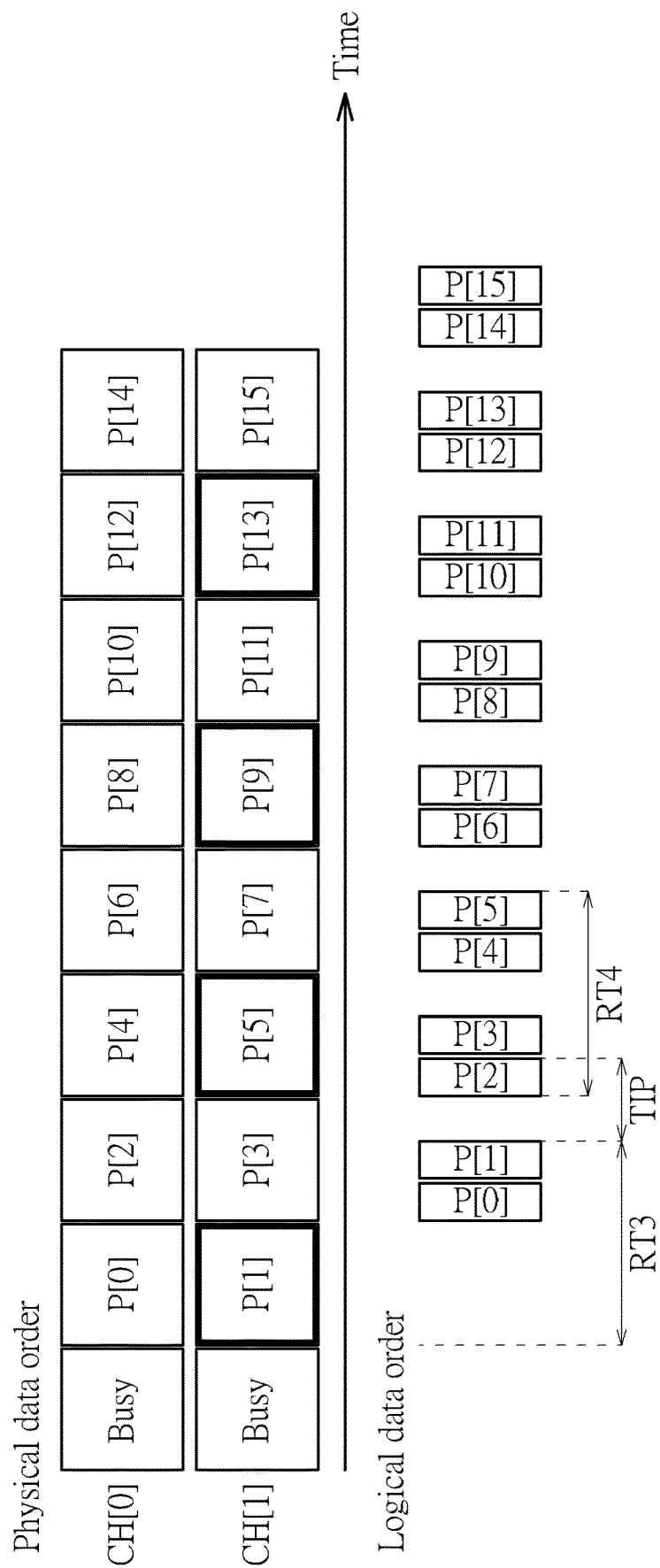
FIG. 11 shows a timing diagram of a read operation to illustrate the corresponding physical data order and logical data order of the read operation performed on the data that was written based on the proposed data processing method.

FIG. 11 shows a timing diagram of a read operation to illustrate the corresponding physical data order and logical data order of the read operation performed on the data that was written based on the proposed data processing method. Similarly, in FIG. 11, the part above the time axis shows the timing of reading data from the memory device 120, where the symbols of the pages P[0]~P[15] are utilized therein to represent the read operations of the corresponding pages, and the part below the time axis shows the timing of providing the read data obtained by the memory controller 110 to the host device 130, where the symbols of the pages P[0]~P[15] are utilized therein to represent the output operations of the corresponding read pages.

Likewise, in FIG. 11, the numbers in the square brackets correspond to the numbers marked by underlines in FIG. 5. With the reference to FIG. 5, those skilled in the art knows into which plane of which memory die each page in FIG. 11 was written, and the consecutive numbers 0~15 in this example are also utilized to represent the continuity of data (e.g., the continuity of the logical addresses of the data, which also shows the logical data order).

As shown in FIG. 11, it is assumed that the read operation of channel CH[0] is slightly earlier than the read operation of channel CH[1], the physical data order in the embodiments of the invention is P[0], P[2], P[1], P[3], P[4], P[6], P[5], P[7], and so on (If the read operation of channel CH[0] and the read operation of channel CH[1] are finished at the same time, the physical data order may be represented by (P[0] & P[1]), (P[2] &P[3]), and so on). As can be seen from FIG. 11, performance of the read operation of page P[1] is earlier than that of page[2], and performance of the read operation of page P[5] is earlier than that of page[6], and the order of reading the pages is just the correct logical data order which can be directly utilized to output the data to the host device 130. Therefore, after the memory controller 110 obtains the data of the pages, the memory controller 110 may directly provide the data to the host device 130 according to the same order of obtaining the data of the pages.

In this embodiment, due to the requirement of parallel processing in dual-channel, the pages P[1], P[5], P[9], . . . and so on, have to be temporarily buffered in the buffer memory 116. Therefore, the retention time RT3 may still be generated for the output of the page[1] and the retention time RT4 may still be generated for the output of the page[5]. However, the retention time RT3 and the retention time RT4 are relatively short as compared to the retention time RT1 and the retention time RT2 shown in FIG. 10. As shown in FIG. 11, the time difference obtained by subtracting the retention time RT3 from the retention time RT1 is the improved (that is, shortened) retention time TIP.

Therefore, in the embodiments of the invention, by properly arranging the write order of writing data into the memory device 120, the data written into a superblock is specially arranged so that when the memory controller 110 has to read the data in the future, the memory controller 110 may directly read each portion of the data in a logical order (or called a logical data order), thereby solving the prior art problem of being necessary to temporarily buffer some portions of the data (which is usually about half or more than half of the data) in the buffer memory 116 (or, in other data buffer of the memory controller 110) causing the portions of the data being unable to be immediately provided to the host device 130 right after they have been read from the memory device 120 due to the drawback that the memory controller cannot sequentially obtain each portion of the data in the logical data order required by the host device 130. Here, the logical order (or the logical data order) is an order of transferring data between the memory controller 110 and the host device 130. In this manner, the retention time that the data has to be buffered in the buffer memory 116 (or other data buffer) is greatly reduced and the data turnover rate of the buffer memory 116 (or other data buffer) is greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
a memory device, comprising a plurality of memory dies, wherein each memory die comprises a plurality of planes, one of the planes of each memory die corresponds to one of a plurality of plane indices, and each plane comprises a plurality of memory blocks, each memory block comprises a plurality of pages, the memory blocks form a plurality of superblocks, each superblock comprises a predetermine number of the memory blocks and the predetermine number of the memory blocks are respectively in different planes of different memory dies; and
a memory controller, coupled to the memory device to access the memory device, wherein in response to a write command received from a host device, the memory controller performs a write operation to write predetermined data into the memory device, and in the write operation, the memory controller selects one from the superblocks as a first target superblock of the write operation and sequentially writes a plurality of portions of the predetermined data into the pages of the first target superblock in a cyclic manner among the memory dies according to an order of the plane indices, wherein each memory die comprises at least a first plane and a second plane, in the write operation of the predetermined data, and corresponding write operations performed on a first page on the first plane of all memory dies of the first target superblock are earlier than corresponding write operations performed on a first page on the second plane of all memory dies of the first target superblock, and wherein one of the superblocks corresponds to one of a plurality of superblock indices, and when a size of an available space of the first target superblock is smaller than or equal to a threshold, the memory controller selects another from the superblocks as a second target superblock of the write operation according to an order of the superblock indices and sequentially writes remaining portions of the predetermined data that have not been written in the memory device into the pages of the second target superblock in the cyclic manner among the memory dies according to the order of the plane indices.

2. The data storage device of claim 1, wherein when the corresponding write operations performed on the first page on the first plane of all memory dies of the first target superblock and the corresponding write operations performed on the first page on the second plane of all memory dies of the first target superblock are completed, the memory controller performs corresponding write operations on a second page on the first plane of all memory dies of the first target superblock, and when the corresponding write operations performed on the second page on the first plane of all memory dies of the first target superblock are completed, the memory controller performs corresponding write operations on a second page on the second plane of all memory dies of the first target superblock.

3. The data storage device of claim 1, wherein the memory dies comprise at least a first memory die and a second memory die, and in the write operation of the predetermined data, corresponding write operations performed on the pages of the first target superblock comprise, in a chronological order, the corresponding write operation performed on the first page on the first plane of the first memory die, the corresponding write operation performed on the first page on the first plane of the second memory die, the corresponding write operation performed on the first page on the second plane of the first memory die, the corresponding write operation performed on the first page on the second plane of the second memory die, the corresponding write operation performed on a second page on the first plane of the first memory die, the corresponding write operation performed on a second page on the first plane of the second memory die, the corresponding write operation performed on a second page on the second plane of the first memory die, and the corresponding write operation performed on a second page on the second plane of the second memory die.

4. The data storage device of claim 3, wherein the first memory die and the second memory die are coupled to same or different channels of the memory device.

5. The data storage device of claim 1, wherein the memory dies comprise a first memory die, a second memory die, a third memory die and a fourth memory die, and in the write operation of the predetermined data, corresponding write operations performed on the pages of the first target superblock comprise, in a chronological order, the corresponding write operation performed on the first page on the first plane of the first memory die, the corresponding write operation performed on the first page on the first plane of the second memory die, the corresponding write operation performed on the first page on the first plane of the third memory die, the corresponding write operation performed on the first page on the first plane of the fourth memory die, the corresponding write operation performed on the first page on the second plane of the first memory die, the corresponding write operation performed on the first page on the second plane of the second memory die, the corresponding write operation performed on the first page on the second plane of the third memory die, the corresponding write operation performed on the first page on the second plane of the fourth memory die, the corresponding write operation performed on a second page on the first plane of the first memory die, the corresponding write operation performed on a second page on the first plane of the second memory die, the corresponding write operation performed on a second page on the first plane of the third memory die, the corresponding write operation performed on a second page on the first plane of the fourth memory die, the corresponding write operation performed on a second page on the second plane of the first memory die, the corresponding write operation performed on a second page on the second plane of the second memory die, the corresponding write operation performed on a second page on the second plane of the third memory die, and the corresponding write operation performed on a second page on the second plane of the fourth memory die.

6. The data storage device of claim 5, wherein the first memory die and the third memory die are coupled to a first channel of the memory device and the second memory die and the fourth memory die are coupled to a second channel of the memory device.

7. The data storage device of claim 1, wherein in response to a read command received from the host device to read the predetermined data, the memory controller reads the predetermined data from the memory device based on a logical order, wherein the logical order of reading the predetermined data equals to a write order of writing the predetermined data into the pages of the first target superblock.

8. The data storage device of claim 7, wherein the logical order is an order of transferring data between the memory controller and the host device.

9. The data storage device of claim 1, wherein each portion of the predetermined data is written into one page of the memory device and two adjacent portions of the predetermined data are written into two different memory dies.

10. A data processing method for a memory device comprising a plurality of memory dies, wherein each memory die comprises a plurality of planes, one of the planes of each memory die corresponds to one of a plurality of plane indices, and each plane comprises a plurality of memory blocks, each memory block comprises a plurality of pages, the memory blocks form a plurality of superblocks, each superblock comprises a predetermine number of the memory blocks and the predetermine number of the memory blocks are respectively in different planes of different memory dies, and the data processing method comprises:

performing a write operation in response to a write command received from a host device to write predetermined data into the memory device, wherein operation of performing the write operation comprises:
selecting one from the superblocks as a first target superblock of the write operation; and
sequentially writing a plurality of portions of the predetermined data into the pages of the first target superblock in a cyclic manner among the memory dies according to an order of the plane indices,
wherein each memory die comprises at least a first plane and a second plane, and operation of sequentially writing the plurality of portions of the predetermined data into the pages of the first target superblock in the cyclic manner among the memory dies according to the order of the plane indices comprises:
sequentially performing a corresponding write operation on a first page on the first plane of all memory dies of the first target superblock; and
sequentially performing a corresponding write operation on a first page on the second plane of all memory dies of the first target superblock,
wherein the corresponding write operations performed on the first pages on the first plane are earlier than the corresponding write operations performed on the first pages on the second plane, and
wherein one of the superblocks corresponds to one of a plurality of superblock indices, and when a size of an available space of the first target superblock is smaller than or equal to a threshold, the data processing method further comprises:
selecting another from the superblocks as a second target superblock of the write operation; and
sequentially writing remaining portions of the predetermined data that have not been written in the memory device into the pages of the second target superblock in the cyclic manner among the memory dies according to the order of the plane indices.

11. The data processing method of claim 10, wherein when the corresponding write operations performed on the first pages on the first plane and the corresponding write operations performed on the first pages on the second plane are completed, the data processing method further comprises:
sequentially performing a corresponding write operation on a second page on the first plane of all memory dies of the first target superblock; and
sequentially performing a corresponding write operation on a second page on the second plane of all memory dies of the first target superblock,
wherein the corresponding write operations performed on the second pages on the first plane are earlier than the corresponding write operations performed on the second pages on the second plane.

12. The data processing method of claim 11, wherein the memory dies comprise at least a first memory die and a second memory die, and in the write operation of the predetermined data, corresponding write operations performed on the pages of the first target superblock comprise, in a chronological order, the corresponding write operation performed on the first page on the first plane of the first memory die, the corresponding write operation performed on the first page on the first plane of the second memory die, the corresponding write operation performed on the first page on the second plane of the first memory die, the corresponding write operation performed on the first page on the second plane of the second memory die, the corresponding write operation performed on the second page on the first plane of the first memory die, the corresponding write operation performed on the second page on the first plane of the second memory die, the corresponding write operation performed on the second page on the second plane of the first memory die, and the corresponding write operation performed on the second page on the second plane of the second memory die.

13. The data processing method of claim 12, wherein the first memory die and the second memory die are coupled to same or different channels of the memory device.

14. The data processing method of claim 10, wherein the memory dies comprise a first memory die, a second memory die, a third memory die and a fourth memory die, and in the write operation of the predetermined data, corresponding write operations performed on the pages of the first target superblock comprise, in a chronological order, the corresponding write operation performed on the first page on the first plane of the first memory die, the corresponding write operation performed on the first page on the first plane of the second memory die, the corresponding write operation performed on the first page on the first plane of the third memory die, the corresponding write operation performed on the first page on the first plane of the fourth memory die, the corresponding write operation performed on the first page on the second plane of the first memory die, the corresponding write operation performed on the first page on the second plane of the second memory die, the corresponding write operation performed on the first page on the second plane of the third memory die, the corresponding write operation performed on the first page on the second plane of the fourth memory die, the corresponding write operation performed on a second page on the first plane of the first memory die, the corresponding write operation performed on a second page on the first plane of the second memory die, the corresponding write operation performed on a second page on the first plane of the third memory die, the corresponding write operation performed on a second page on the first plane of the fourth memory die, the corresponding write operation performed on a second page on the second plane of the first memory die, the corresponding write operation performed on a second page on the second plane of the second memory die, the corresponding write operation performed on a second page on the second plane of the third memory die, and the corresponding write operation performed on a second page on the second plane of the fourth memory die.

15. The data processing method of claim 10, wherein the first memory die and the third memory die are coupled to a first channel of the memory device and the second memory die and the fourth memory die are coupled to a second channel of the memory device.

16. The data processing method of claim 10, further comprising:
reading the predetermined data from the memory device based on a logical order in response to a read command received from the host device to read the predetermined data,
wherein the logical order of reading the predetermined data equals to a write order of writing the predetermined data into the pages of the first target superblock.

17. The data processing method of claim 16, wherein the logical order is an order of transferring data between a memory controller of the memory device and the host device.

18. The data processing method of claim 10, wherein each portion of the predetermined data is written into one page of the memory device and two adjacent portions of the predetermined data are written into two different memory dies.

* * * * *